May 20, 1952  S. J. MIKINA  2,597,164
HELICOPTER CONTROL SYSTEM
Filed Nov. 14, 1947  2 SHEETS—SHEET 2

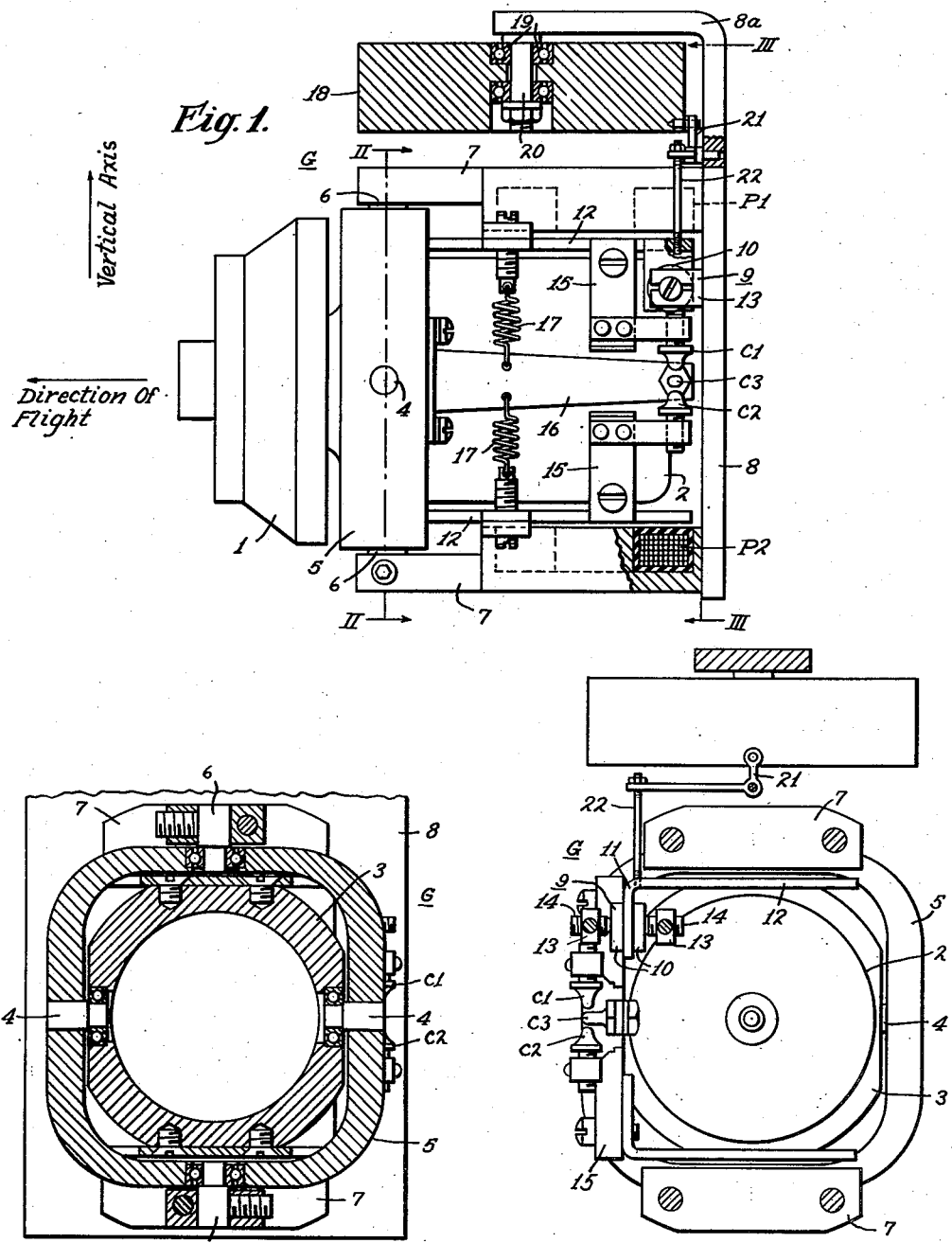

WITNESSES:
Edward Michaels
E. F. Oberheim

INVENTOR
Stanley J. Mikina.
BY Paul E. Friedemann
ATTORNEY

Patented May 20, 1952

2,597,164

UNITED STATES PATENT OFFICE 2,597,164

HELICOPTER CONTROL SYSTEM

Stanley J. Mikina, Pittsburgh, Pa., assignor to Westinghouse Electric Corporation, East Pittsburgh, Pa., a corporation of Pennsylvania Application November 14, 1947, Serial No. 785,885

9 Claims. (Cl. 244—17.13)

This invention relates generally to systems for controlling bodies movable in space and more in particular to systems for controlling the steering propellers of helicopters.

To this end this invention is illustrated in the control of the pitch of a steering propeller of a helicopter. However, it will be apparent that the present invention is not limited to this specific application but may be utilized in other types of craft employing means other than a propeller for effecting maneuverability. In this respect reference may be had to the copending application of Clinton R. Hanna, Serial No. 785,983, filed on the same date as this application, entitled Control Systems and assigned to the same assignee as this invention. In certain of its aspects this invention is related to the above-mentioned copending application.

In one type of helicopter the necessary lift and thrust for sustaining and propelling, respectively, the craft in the air are obtained by means of a power driven rotor or propeller comprising a plurality of blades radiating from a central hub and forming the lifting propeller for the craft. The lifting propeller rotates about a vertically disposed drive shaft and motion in any direction is obtained by tilting of the plane of rotation of the propeller. In the present instance, this tilting is accomplished by suitable means affording a cyclic variation in blade angle during each revolution of the propeller, the blade angle being maximum at one point and, at a point 180° removed therefrom, being minimum. This cyclic variation in blade angle results in a variation in lift about the plane of rotation and causes the articulated blade assembly to tilt about an axis displaced from that defined by the maximum and minimum blade angle position giving a horizontal component of thrust in the direction of tilting of the rotor or propeller plane.

The torque reaction of the lifting propeller is transmitted to the fuselage of the helicopter tending to rotate the fuselage about the vertical propeller shaft oppositely to the rotational direction of the lifting propeller. Since this counter torque is to be opposed over the entire horizontal speed range of the helicopter including zero speed, the conventional rudder employed on fixed wing aircraft is not suitable and such means as counter torque or steering propellers, jets, etc., are employed to maintain the desired orientation of the helicopter in azimuth.

The steering propeller may be of the reversible pitch type, i. e., its blade angle may be varied from maximum in one direction to maximum in the opposite direction, suitable pitch changing mechanism under the pilot's control effecting this variation in pitch to provide the desired torque balance about the vertical drive shaft.

Some difficulty is encountered through direct manual control in the detection and proper correction of angular drift about the mentioned vertical axis. This is particularly true during take-off and landing operations of the helicopter. The variables influencing angular drift will be more thoroughly discussed hereinafter. It is to the end of automatically correcting angular drift that this invention is directed.

One object of this invention is to provide a control for a body movable in space which is simple in principle, involves a minimum number of parts and is positive in operation.

Another object of this invention is to provide a system of control for a body operable in space which is compact in design and light in weight.

An additional object of this invention is to provide a system of the character referred to embodying a gyroscope for detecting angular motion of the body about a given axis in which the gyroscope is restrained and cannot tumble.

A further object of this invention is to provide a system for stabilizing a craft about a given axis in which a velocity type of gyroscope is employed to detect angular motion about a given axis and the gyroscope is restrained from appreciable movement.

A specific object of this invention is to provide a system for controlling the steering propeller of a helicopter in which a velocity type gyroscope is employed to detect angular velocities about the turn axis of the craft.

A further specific object of this invention is to provide a system for controlling the steering propeller of a helicopter embodying a velocity type gyroscope for detecting angular velocity about the turn axis of the craft in which an acceleration control is imposed on the velocity type gyroscope.

The foregoing statements are merely illustrative of the various aims and objects of this invention. Other objects and advantages will become apparent upon a study of the following specification when considered in conjunction with the accompanying drawings, in which:

Figure 1 is a fragmentarily sectioned side elevational view of a type of gyroscope embodied in this invention;

Fig. 2 is a sectional view taken on the line II—II of Fig. 1 with the motor omitted in the interest of simplicity;

Fig. 3 is a sectional view taken on the line III—III of Fig. 1;

Figure 4:
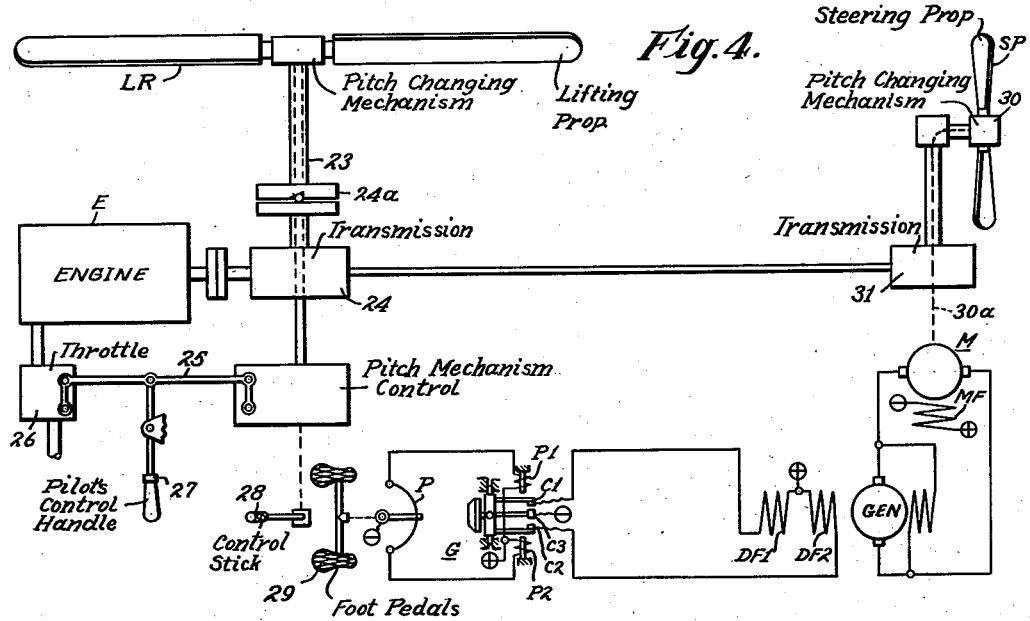
Fig. 4 is a schematic diagram of a control system embodying the principles of this invention demonstrating the application to a helicopter control.

This invention will be more readily appreciated and understood upon a consideration of the specific gyroscope and the manner in which it functions.

The gyroscope is illustrated in Figs. 1 through 3 and includes generally, a rotor 1 mounted on the overhanging shaft (not shown) of a direct current motor 2, only the housing of which is shown. The motor housing is secured within an annulus 3 journalled about the diametrically oppositely disposed stub shafts 4 defining a horizontal axis, as viewed, about which the rotor assembly of the gyroscope pivots. The stub shafts 4 are tightly secured in the gimbal ring 5 which in turn is journalled about a pair of stub shafts 6 defining a vertical pivot axis, as viewed for the rotor assembly of the gyroscope. Stub shafts 6 are secured in the extremities of a pair of supports 7, the remaining extremity of each support being secured to a base plate 8 which carries the complete assembly. For the purposes of this discussion, the axis defined by the stub shafts 4 may be regarded as the output or precession axis of the gyroscope.

Although the gyroscope can be disposed at any angle about the vertical axis and will respond to angular velocity of turn of the aircraft, a specific way of orientating the gyroscope in the helicopter is indicated by the arrows in Fig. 1. The horizontally disposed arrow substantially parallels the longitudinal axis of the craft and is identified "Direction of Flight." Thus, when installed, the rotor of the gyroscope points in the direction of flight. The vertically disposed arrow represents the vertical axis of the craft and is identified "Vertical Axis" in the drawings, and the axis of the gyroscope assembly defined by the stub shafts 6 substantially parallels the vertical axis of the craft. The output or precession axis of the gyroscope defined by stub shafts 4 is normal to both the vertical axis and the rotor or spin axis of the gyroscope assembly and therefore lies in a substantially horizontal plane for the general condition indicated. It will be appreciated that this axis may be disposed at any angle in the horizontal plane.

When installed in the craft as illustrated and described, the gyroscope may be utilized to detect angular velocities about the vertical or turn axis thereof. A turn angular velocity causes the gyroscope to develop a torque about its horizontal or precession axis 4—4 proportional in magnitude and direction to the turn angular velocity. This gyroscopic response may be utilized to operate suitable instrumentalities in controlling the input velocity.

The coupling between the gyroscope and the aircraft is of the form of a friction damper 9 which damps precessional motion of the gyroscope about the axis of stub shafts 4 and which causes the gyroscope to assume the turn velocity of the aircraft. The damper assembly includes a pair of friction shoes 10 disposed on opposite sides of a mating plate 11 which is a continuation at right angles of a support plate 12 secured to annulus 3, the plane of the support plate 12 paralleling the horizontal output axis of the gyroscope and the plane of the mating plate 11 defining a plane of rotation about the mentioned horizontal axis extending between the friction shoes 9. Suitable supporting means for the friction shoes includes a pair of lugs 13 secured to base plate 8 which threadedly receive screws 14, each of which engages and supports a friction shoe and the screws are so adjusted that a small clearance of the plate 11 therebetween is afforded to provide limited angular motion of the gyroscope about the vertical axis between the friction shoes. Alternatively, gimbal ring 5 may be rigidly connected to the aircraft and the precessional motion of the gyro about axis 4—4 may be damped by means of an air dashpot or a dashpot using any other suitable fluid.

Motion of the helicopter about the vertical or turn axis thereof carries the base 8 therewith moving a friction shoe into engagement with the adjacent surface of plate 11, the force thus applied being transmitted to annulus 3 and thence through stub shafts 4 to gimbal 5, thereby rotating the assembly about the vertical axis of stub shafts 6 and displacing the axis of the rotor. The precessional response of the gyroscope produces angular motion about the horizontal axis of shafts 4 developing a reaction torque about the vertical axis in opposition to the applied torque and proportional thereto. Thus, the force engaging the friction shoes with plate 11 varies with the angular velocity of precession and proportionality of friction damping of the precessional motion follows as a result of the normal shoe force times the coefficient of friction between plate and shoe.

Precessional motion of the gyroscope is utilized to actuate a set of contacts C1, C2 and C3 which, as will be described hereinafter, control a servo system actuating the steering propeller of the helicopter. A pair of brackets 15 mounted on the respective plates 12 which are secured to opposite sides of the annulus 3 support the contacts C1 and C2 in opposed relation. Thus, precessional motion of the gyroscope moves the contacts C1 and C2 through an arc about the axis of stub shafts 4. An arm 16 secured to gimbal 5 supports the contact C3 between the contacts C1 and C2 which therefore selectively engage contact C3, depending upon the direction of angular precession motion, and the contact assembly is centered by a pair of centering springs 17 connected on opposite sides of member 16 between the plates 12 and the arm 16. As in the case of the friction shoes, the contacts C1 and C2 are closely adjusted with respect to the contact C3 so that precessional motion for contact closure is not appreciable. Thus, the gyroscope is constrained about both its horizontal and vertical axes, in effect, locking it to the craft, and tumbling thereof irrespective of flight attitude cannot occur.

The gyroscope assembly is such as to afford hovering operation of the contact set so that a current flowing through the contacts will be controlled in dependence of the input velocity, to provide proportionality of the corrective forces at the steering propeller. There are several ways of obtaining this function. In the present construction, the rotating system of the gyroscope is not perfectly dynamically balanced so that alternating torques of predetermined magnitude are produced about the horizontal or precession axis, corresponding in frequency to the running frequency of the rotating system. The unbalance forces transmitted to the contacts need not be so large as to produce complete contact separation but only sufficient to produce contact motion of the order, for instance, of a few millionths of an inch to cause a hovering condition. Thus, the precession torque producing the force closing the contacts in one direction is modified by the alternating torque of the rotating system, and hovering conact operation results, affording an average contact resistance and average current therethrough indicative of the input velocity or turning velocity of the helicopter.

In order that the craft may be maneuvered in turns, suitable control of the gyroscope must be had. The control illustrated includes an electromagnetic biasing arrangement for producing torques about the precessional axis of the gyroscope. For this purpose, two electromagnets are provided, one including an annular coil P1 arranged in a suitable recess in one support 7 and the other including an annular coil P2 arranged in a suitable recess in the other support 7. In this connection, supports 7 are preferably of magnetizable material and form the cores of the electromagnets. The armatures of the electromagnets are formed by the plates 12, also of magnetizable material. It will be observed that the outer face of each of these plates is spaced from the associated core to form a small airgap. Energization of either coil correspondingly tilts the gyroscope about its precession axis to close one pair of the contact set, the contact force depending upon the applied torque.

Another feature of the gyroscope assembly resides in the mass 18 journalled by bearings 19 about a vertical shaft 20 secured to an extension 8a of the base 8. A point on the periphery of the mass 18 is connected by a bell crank 21 pivotally attached to base 8 and a rod 22 to one of the plates 12. Thus, relative angular motion of the helicopter and gyroscope assembly with respect to the mass 18 actuates the bell crank and rod system, linking the mass and the gyroscope, to produce a tilting motion about the precession axis of the gyroscope, resulting in contact forces augmenting the gyroscopic forces due to velocity response. It will be apparent that the described arrangement introduces an acceleration response into the system tending further to anticipate angular velocities about the turn axis of the helicopter.

As previously described and referring now to Fig. 4, the specific type of helicopter to which the present invention is applied, is equipped with a lifting rotor LR and a steering propeller SP. In general, the blades on the lifting rotor radiate out from a central hub containing the usual pitch changing mechanism, on the upper end of a shaft 23 that projects above the fuselage of the craft (not shown) and the shaft is driven by an engine E within the fuselage through a suitable transmission 24. This transmission is of conventional design and is not detailed since, per se, it forms no part of this invention. Included in the lifting rotor drive is a free wheeling unit 24a that allows the engine speed to drop below the lifting rotor R. P. M., or even to stop, without impeding the lifting rotor rotation, except of course, for the inherent friction of the free wheeling unit and other points of journalling of the rotor shaft. The free wheeling tie between the shaft and the engine is used in the control of the craft during descent to lower altitudes or in landing, as will be described later.

The blades of the lifting rotor are articulated at the hub so that they are free to pivot about a horizontal axis perpendicular to the rotor shaft 23 in response to the aerodynamic and centrifugal forces acting thereon. Each blade is also rotatable about its longitudinal axis in order to effect a change in the blade pitch. One part of the lifting rotor pitch control is coordinated with the engine throttle and is used to automatically increase the engine throttle as the blade pitch is increased. In the drawing, this is represented by a link 25 between the transmission 24 and throttle 26, which link is actuated by a handle 27 under the control of the pilot to simultaneously control the blade angle or pitch setting of the lifting rotor and the throttle. This is generally known as the "fixed-pitch" control. Another part of the lifting rotor pitch control is actuated by the pilot's control stick 28 which is used to effect cyclic changes in the rotor pitch so that the angle of a blade can be varied from a maximum at any point in its plane of spin to a minimum at a point 180° removed. This cyclic pitch control is used to maneuver the craft by causing the resultant force of the lifting rotor on the rotor axle or shaft 24 to assume different angles with respect to the axle. Thus, for clockwise rotation of the lifting rotor as viewed from the top, when the pilot's control stick 28 is moved forward, the rotor blade angle becomes, for example, maximum at the right of the pilot and minimum at his left. Due to the fact that the motion of the blades, about their horizontal pivot axes at the rotor hub lags the blade angle setting by 90°, the corresponding increase and decrease in blade lift causes the plane of the lifting rotor to tilt forward producing a forward component of rotor force for propelling the craft in a forward direction. Similarly, movement of the cyclic pitch control stick to the right or to the left will shift the direction of the horizontal component of the rotor force to right or left, respectively.

During operation of the helicopter when the engine is driving the lifting rotor or propeller, the engine torque reaction on the fuselage is prevented from counter-spinning the craft by the provision of an equal and opposite torque on the fuselage by means of the small high speed propeller SP mounted on the after extremity of the fuselage and spinning about a horizontal axis perpendicular to the longitudinal axis of the craft. This torque equilibrating propeller has variable pitch blades and control of its counter-torque is effected by setting the blade angle to produce the desired equilibrium pitch value by movement of the foot pedals 29 which, in the craft being described, are usually directly connected, for instance, to control the pitch mechanism 30 of the steering propeller. The counter-torque propeller SP is driven from the main engine E through a suitable transmission 31. Hence, the counter-torque or steering propeller pitch must be changed whenever there is a change either in the engine speed or the engine torque in order to maintain torque equilibrium.

When it is realized that the maintenance of a given fuselage orientation in azimuth depends upon the exact balancing of the lifting rotor torque and the steering propeller torque reaction on the fuselage, it can be appreciated that transient drift of the fuselage at varying angular velocities will be caused by such conditions as wind gusts across the lifting rotor or the steering propeller, and as a result of transient accelerating torque on the lifting rotor. Such momentary torque unbalances are more apt to occur during the maneuvers of taking off or landing, when they are most disturbing to the pilot and will require constant manipulation of the foot pedals in an effort to balance the torques of the two propellers. For example, in the maneuver of descending to a lower altitude as the handle 27 is moved to reduce the engine throttle 26 and the engine speed drops, the lifting rotor continues to rotate for some time at a speed above the engine speed, being maintained in rotation by aerodynamic forces on the lifting rotor blades arising from the descent or the forward glide of the craft. The free wheeling member 24a in the transmission drive between the engine and the lifting rotor allows the engine speed to fall below the corresponding rotor speed without measurably impeding rotation of the rotor. As the rotor is thus kept in rotation due to forces acting externally of the fuselage, frictional forces tend to drag the craft around in rotation with the rotor. Thus, in this maneuver of dropping of altitude, the direction of the reaction torque on the fuselage is reversed and the steering propeller pitch must also be slightly reversed to maintain torque equilibrium on the craft. All such momentary discrepancies between the lifting rotor torque and the steering propeller torque must be immediately resolved by the pilot by foot pedal trimming of the steering propeller pitch.

A means for automatically maintaining fuselage torque balance, which means is also under the control of the pilot to be used as a means for changing the orientation of the fuselage in azimuth and the direction of travel of the helicopter, is illustrated in Fig. 4. The heart of the system is the velocity responsive gyroscope assembly G previously described, which in the interest of simplicity is herein schematically shown. In this embodiment of the invention, an electric servo-system is connected with the gyroscope contacts C1, C2 and C3 to control the pitch changing mechanism 30 of the steering propeller. In this arrangement, a direct current motor M is mechanically connected with the pitch mechanism 30 by means of a shaft 30a, the motor field winding MF being excited from a suitable source of direct current, here designated in the interest of simplicity, by the positive and negative signs. The motor is controlled by a generator GEN having its armature winding connected with the armature winding of the motor. While a shunt type generator is shown, it will be appreciated that any suitable type may be employed. The generator output is controlled by a pair of differentially related field windings DF1 and DF2, each of which is connected in series with one of the contacts C1 and C2, respectively, and the source of direct current indicated. Thus, closure of contacts C1 and C3 energizes field winding DF1 in one sense and closure of contacts C2 and C3 energizes field winding DF2 in an opposite sense. In each case, it will be recalled the degree of excitation depends upon the current passed by the associated gyroscope actuated contacts. Hence, the motor voltage and as follows, the motor speed, depend upon the function of the gyroscope which in turn depends upon the velocity and if desired also the acceleration in yaw or turn of the helicopter.

The coils P1 and P2 of the electromagnets are connected in series with tapped portions of a potentiometer P, the movable tap of which is controlled by the foot pedals 29. This circuit is energized by connection of the movable potentiometer tap and a point between the coils across a source of direct current. As so arranged, the two coils are constantly energized and the gyroscope is in neutral position, assuming like electromagnetic properties of the electromagnets when the movable tap of P1 is in mid-position.

During conditions of flight when turning of the craft is not desired, the foot pedals are in mid-position and the gyroscope functions as an azimuth stabilizer of the fuselage. Any tendency of the fuselage to yaw is preceded by acceleration and velocity in the order named, before actual displacements occur. The function of the gyroscope thus becomes that of detecting the mentioned quantities and controlling the generator, motor and pitch mechanism to check the unwanted quantities and prevent the impending angular motion.

When it is desired to change the direction of the craft, the foot pedals are operated. This electromagnetically biases the gyroscope in a direction to produce the desired change of the steering propeller pitch mechanism. When the new course is established, the foot pedal assembly is centered and the gyroscope resumes its function as an azimuth stabilizer. For a given position of the cyclic pitch control stick 28, the helicopter will change its direction of flight with a change in the azimuthal orientation of the fuselage, since the control stick 28 moves with the fuselage to maintain the existing relation of the horizontal component of thrust of the lifting rotor with respect to the fuselage.

Figure 5:
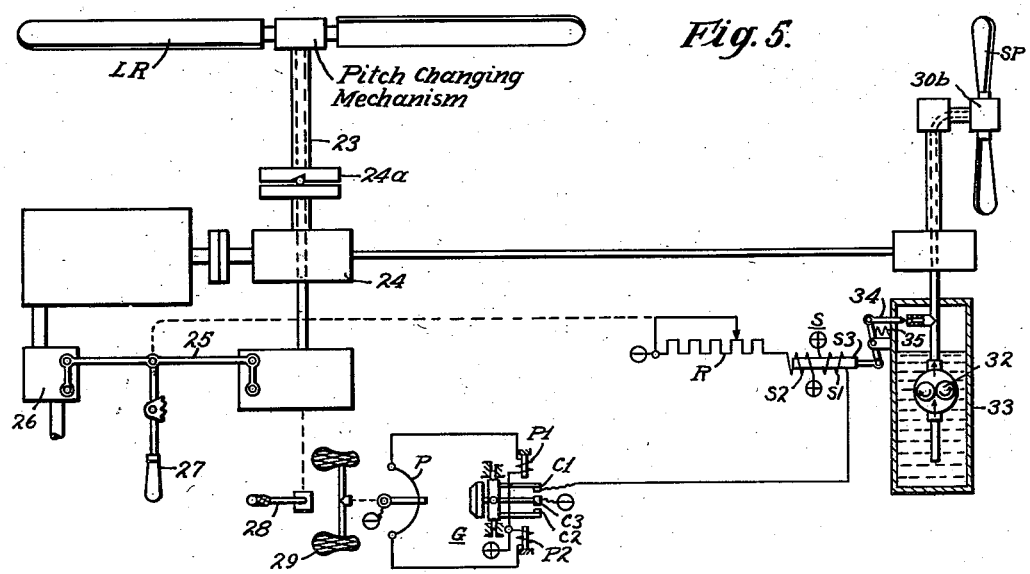
Fig. 5 is a modification of the invention of Fig. 4.

The modification of the invention appearing in Fig. 5 embodies a hydraulic servo-system in place of the electric system of Fig. 4. In this embodiment, the pitch mechanism 30b is hydraulically operated. The fluid pressure source for supplying the required fluid pressure includes a simple gear pump 32 which operates in an oil sump 33. This pump preferably is operated at constant speed to maintain a constant volume output.

The fluid pressure delivery to the pitch mechanism is controlled by means of an electromagnetically operated or solenoid valve S having a pair of coils S1 and S2 and a plunger S3. The plunger of the valve is connected with a needle type valve 34 which taps the fluid line between the pump 32 and the pitch mechanism 30b and variations in the setting of the valve to tap the line correspondingly controls the pressure at the pitch mechanism. The valve is biased to open position by means of a spring 35 and the coils produce a magnetic pull on the plunger tending to close the valve.

Coil S1 is energized in a series circuit including the contacts C1 and C3 of the gyroscope, the circuit being energized across a suitable supply of direct current, as indicated. Thus, for one direction of yaw of the craft, the gyroscope contacts are closed to control the solenoid valve and hence, the pitch mechanism, this operation tending to close the valve and increase the pressure at the pitch mechanism. For the reverse direction of yaw, the spring 35 tends to open the valve and reduce the pressure at the pitch mechanism 30b, covering both directions of yaw of the craft.

An additional feature of the scheme of Figure 5 is the use of the coil S2 of the solenoid valve to provide a predetermined pitch of the steering propeller dependent upon the setting of the fixed pitch control of handle 27. Coil S2 is connected in series with a resistor R across a source of direct current. The magnitude of resistor R is varied depending upon the movement of handle 27, as indicated by the broken line. Thus, when the pitch of the lifting rotor and the engine throttle are increased producing a higher reaction torque on the fuselage, more of the resistor R is shunted to increase the current through the coil S2 and the pressure on the pitch mechanism 30b to increase the steering propeller pitch and its counter torque. With this connection, the duty of the gyroscope stabilizer is greatly reduced, as this unit then only has to furnish the fine trimming control of pitch that is required if the throttle proportional pitch change does not effect complete fuselage torque balance.

The foregoing disclosure and the showings made in the drawings are merely illustrative of the principles of this invention and are not to be interpreted in a limiting sense. The only limitations are to be determined from the scope of the appended claims.

I claim as my invention:

1. In a system for controlling a craft movable in space, the combination of control means for effecting motion of said craft about an axis of freedom thereof, a gyroscope having freedom of precessional movement, means securing said gyroscope to said craft to respond to the velocity of motion of said craft about said axis of freedom and produce precession torques proportional to the velocity of said motion, contact means connected with said gyroscope to be engaged by a force proportional to said precession torques, means for vibrating said contact means to cause opening and closing thereof at a given frequency, a motor for operating said control means, a generator for energizing the motor, field winding means for the generator, and circuit means connecting said contact means with said field winding means for controlling the excitation of the field winding means.

2. In a system for controlling a craft operable in space, the combination of control means for effecting motion of said craft about an axis of freedom thereof, a gyroscope, means forming a precession axis for said gyroscope affording movement of said gyroscope thereabout, means securing said gyroscope to said craft to respond to the velocity of motion of said craft about said axis of freedom and produce precession torques proportional to the velocity of said motion, contact means connected with said gyroscope to be engaged by a force proportional to said precession torques, means for vibrating said contact means to cause opening and closing thereof at a given frequency, a motor for operating said control means, a generator for energizing the motor, field winding means for the generator, circuit means connecting said contact means with said field winding means for controlling the excitation of the field winding means, and electromagnetic means disposed to bias said gyroscope about the precession axis thereof to control said contact means.

3. In a system of control for a craft operable in space, said craft having control means for effecting motion about an axis of freedom thereof, the combination of, a gyroscope, means forming an axis of precession for the gyroscope affording movement of said gyroscope thereabout, means securing said gyroscope to said craft to respond to the velocity of motion of said craft about said axis of freedom and produce precession torques proportional to the velocity of said motion, contact means connected with said gyroscope to be actuated by the motion of precession thereof, electromagnetically operated means having winding means for operating said control means, circuit means connecting said winding means to said contact means to control the excitation of the winding means, an electromagnet, means of magnetic material connected with said gyroscope and forming an armature for said electromagnet to bias said gyroscope about the axis of precesssion thereof, manually operated circuit means connected with said electromagnet to control the energization thereof, and means forming a part of said gyroscope for vibrating said contact means.

4. Apparatus as set forth in claim 3 in which said last-named means comprises a dynamically unbalanced rotating system in the gyroscope for producing alternating torques about said axis of precession of a frequency corresponding to the running frequency of the said rotating system.

5. In a system of control for a craft operable in space, said craft having control means for effecting motion about an axis of freedom thereof, the combination of, contact means, means responsive to the velocity of motion of said craft about said axis of freedom for actuating said contact means, means responsive to the rate of change of motion of said craft about said axis of freedom for actuating said contact means, piloting means for actuating said contact means, means for vibrating said contact means, and circuit means connecting said contact means and said control means for operating said control means.

6. In a system of control for a craft operable in space, said craft having control means for effecting motion about an axis of freedom thereof, the combination of, a gyroscope, means forming a precession axis for the gyroscope affording movement of said gyroscope thereabout, means securing said gyroscope to said craft to respond to the velocity of motion of the craft about said axis of freedom and produce precession torques proportional to the velocity of said movement, contact means connected with said gyroscope to be actuated by the precessional motion of said gyroscope, a mass, bearing means rotatably mounting said mass for rotation about its center of gravity, means securing said bearing means to said craft with the axis thereof substantially parallel to said axis of freedom of the craft, means responsive to relative rotational motion of said craft and said mass for biasing said gyroscope about the precession axis thereof, and circuit means connecting said contact means and said control means to operate said control means.

7. In a system of control for a craft operable in space, said craft having control means for effecting motion about an axis of freedom thereof, the combination of, a gyroscope, means forming a precession axis for the gyroscope affording movement of said gyroscope thereabout, means securing said gyroscope to said craft to respond to the velocity of motion of the craft about said axis of freedom and produce precession torques proportional to the velocity of said movement, contact means connected with said gyroscope to be actuated by the precessional motion of said gyroscope, a rotatably mounted mass, means securing said mass to said craft with the axis thereof substantially parallel to said axis of freedom of the craft, linkage means connecting said mass with said gyroscope, said linkage means connecting with said gyroscope at a point removed from the precession axis thereof to bias said gyroscope thereabout upon relative angular motion of said craft and said mass, an electromagnet, means of magnetic material connected with said gyroscope to move therewith about the precession axis thereof, said means of magnetic material forming an armature for said electromagnet, circuit means for energizing said electromagnet and introducing a predetermined bias about the precession axis of the gyroscope, and circuit means connecting said contact means and said control means to operate said control means.

8. In a system of control for a helicopter having a steering propeller and a pitch changing mechanism for the steering propeller, the combination of, a motor for driving the pitch changing mechanism, a generator for energizing the motor, field winding means for the generator, a gyroscope having at least one axis of freedom constituting the axis of precession thereof, means securing said gyroscope to said helicopter to respond to the velocity of helicopter motion about the turn axis thereof and produce precessional torques proportional thereto, contact means responsive to said precessional torques for exciting said field winding means, means responsive to acceleration of said helicopter about the turn axis thereof for biasing said gyroscope about the precession axis thereof, and manually operated means for biasing said gyroscope about said precession axis.

9. In a system of control for a craft operable in space, said craft having control means for effecting motion about an axis of freedom thereof, the combination of, a gyroscope, means forming a precession axis for the gyroscope affording movement of said gyroscope thereabout, means securing said gyroscope to said craft to respond to the velocity of motion of the craft about said axis of freedom and produce precession torques proportional to the velocity of said movement, contact means connected with said gyroscope to be actuated by the precessional motion of said gyroscope, manually operated means for biasing said gyroscope about said precession axis to actuate said contact means, torque producing means physically associated with said gyroscope for producing rapidly varying torques about the precession axis of the gyroscope for vibrating said contact means, and circuit means connecting said contact means and said control means to operate said control means.

STANLEY J. MIKINA.

REFERENCES CITED

The following references are of record in the file of this patent:

UNITED STATES PATENTS

| Number | Name | Date |
|---|---|---|
| 1,801,947 | Boykow | Apr. 21, 1931 |
| 1,801,948 | Boykow | Apr. 21, 1931 |
| 1,869,840 | Boykow | Aug. 2, 1932 |
| 1,996,055 | Boykow | Apr. 2, 1935 |
| 2,146,620 | Brown et al. | Feb. 7, 1939 |
| 2,221,748 | Alkan | Nov. 19, 1940 |
| 2,369,652 | Avery | Feb. 20, 1945 |
| 2,443,192 | Moeller | June 15, 1948 |
| 2,464,629 | Young | Mar. 15, 1949 |
| 2,479,549 | Ayres et al. | Aug. 23, 1949 |

OTHER REFERENCES

"Aero Digest," pages 85, 115 and 116, November 1946.